Figure 1:
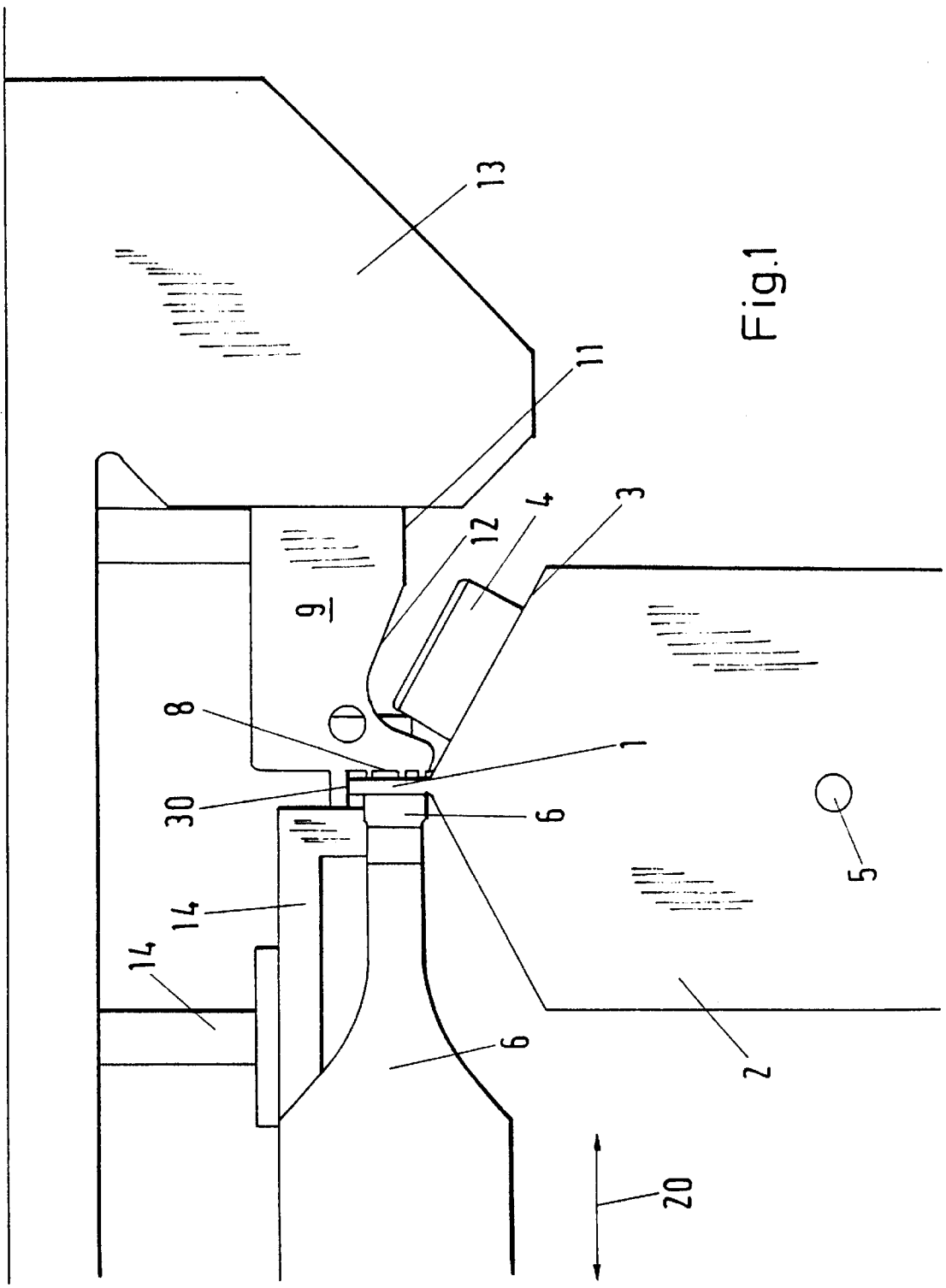

United States Patent [19]
Martin

[11] Patent Number: 5,976,315
[45] Date of Patent: Nov. 2, 1999

[54] ANVIL FOR AN ULTRASOUND SEALING UNIT

[75] Inventor: Peter Josef Martin, Geisenheim, Germany

[73] Assignee: Tetra Laval Holdings & Finance S.A., Pully, Switzerland

[21] Appl. No.: 08/984,970

[22] Filed: Dec. 4, 1997

[30] Foreign Application Priority Data

Dec. 10, 1996 [DE] Germany .......................... 196 51 242

[51] Int. Cl.⁶ .................................................. B29C 65/08
[52] U.S. Cl. .................................... 156/580.2; 156/580.1
[58] Field of Search ............................... 156/73.1, 580.1, 156/580.2; 425/174.2; 264/442, 443, 445

[56] References Cited

U.S. PATENT DOCUMENTS

| 4,159,220 | 6/1979 | Bosche et al. .......................... 156/73.1 |
| 4,241,560 | 12/1980 | Deimel et al. .............................. 53/373 |
| 4,251,303 | 2/1981 | Meimel et al. ......................... 156/73.1 |
| 4,403,465 | 9/1983 | Bachner ..................................... 53/477 |
| 4,517,790 | 5/1985 | Kreager ..................................... 53/552 |
| 4,534,818 | 8/1985 | Kreager et al. ......................... 156/466 |
| 4,681,645 | 7/1987 | Fukushima et al. .................... 156/73.1 |
| 4,767,492 | 8/1988 | Fukushima et al. ................. 156/580.2 |
| 5,605,026 | 2/1997 | Schott et al. ........................... 53/373.7 |
| 5,775,055 | 7/1998 | Giacomelli et al. ................... 53/371.2 |

FOREIGN PATENT DOCUMENTS

| 1078345 | 5/1980 | Canada . |
| 2744640 | 4/1978 | Germany . |
| 2812138 | 6/1983 | Germany . |
| 2703012 | 8/1985 | Germany . |
| WO9609958 | 4/1996 | WIPO . |

*Primary Examiner*—James Sells
*Attorney, Agent, or Firm*—Michael L. Dunn

[57] ABSTRACT

Anvil for an ultrasonic sealing unit for sealing at least two sections composed of a plastic coated support material; wherein the ultrasonic sealing unit comprises a sonotrode movable relative to the anvil. The anvil has an anvil body with a sealing surface at a front of the body. The sealing surface has raised and indented areas where the raised areas are configured as narrow ribs. One of the ribs is a lower retaining rib running along a free lower edge of the sealing surface. Another of the ribs is a central sealing rib, above and parallel to the lower retaining rib, which central sealing rib extends across the entire width of the sealing surface.

15 Claims, 6 Drawing Sheets

ANVIL FOR AN ULTRASOUND SEALING UNIT

The invention relates to an anvil for an ultrasound sealing unit for sealing at least two sections of material which are composed of plastics coated support material, with a sonotrode movable relative to the anvil, wherein the sealing surface located at the front on the anvil body is profiled with raised and indented areas.

Paper, paper pulp or cardboard, for example, can be envisaged as the plastics coated support material for a package for flowable media, which is closed in a fluid-tight manner in the manufacturing machinery at different places by sealing. Gabled packages made of plastics coated paper are known, wherein the gable has two sections of material sealed together at the top. In order to seal such sections of material, which can also be described as a doubled over web, closing rib, tongue or upper cross-sealing seam, the widest variety of devices can be used, for example heated jaws, hot air or ultrasound. The sealing unit according to the invention uses ultrasound which is produced by a sonotrode and is introduced into the sections of material to be sealed which are located between the anvil and the sonotrode. The front surface of the sonotrode is generally planar, while the anvil opposite the sonotrode has already been provided with profiling.

With the known ultrasound sealing units, however, in general only two layers can be sealed together, wherein the sealing is extensive. Because of this the manufacture is limited in the configuration of the packages or of the sections of material to be joined together. The tools must also be brought to relatively high temperatures which causes problems for the tools and also for the product to be treated, mostly problems of over-heating. Even then, good sealing of several layers is not always possible in this manner.

The object of the present invention is therefore to provide an anvil of the type described in the introduction such that the resulting ultrasound sealing unit can also seal more than just two sections or layers of material together.

The solution to this object is provided according to the invention in that the raised areas are configured as narrow ribs, these being a lower retaining rib running along the free lower edge of the sealing surface, and a central sealing rib, extending over the entire width of the sealing surface, arranged at a distance above said retaining rib and parallel thereto. To seal two sections of material, said sections are placed in a sufficiently wide gap between the front surface of the anvil, that is to say in this case the so-called sealing surface, and the planar front surface of the sonotrode. Afterwards, these two front faces are pressed together by the relative movement of the sonotrode against the anvil. The front surface of the anvil adjacent to the section of material is the sealing surface. The direction of movement of the sealing unit, in which the anvil described herein is preferably envisaged as stationary, is perpendicular to this. The narrow ribs, the width of which can be, for example, 1.5 mm or 2 mm or 3 mm, according to the size of the sections of material to be sealed, project at right-angles from this sealing surface as raised areas.

If the sealing surface is assumed as being rectangular with a width and a height, then the width is assumed as being greater than the height. The cross-sealing seam of the longitudinal sections of material to be sealed together also extends in the direction of this width, said sections being moved in front of the sealing surface, in the direction parallel thereto, and also moved away from it again. This sealing surface, which can be envisaged, for example, as substantially rectangular, has a free lower edge which, in this present preferred embodiment of the anvil is at the same time the front lower edge of the anvil. The retaining rib is connected to this bottom edge, its function being the keep the two sections of material together while the sealing takes place above them. For better understanding of the terms "lower edge" and "bottom", one can proceed from a preferred embodiment in which, for example, filled packages made from plastics coated paper (cardboard, paper pulp) which are folded and configured as a gable have to be sealed along a corresponding sealing seam arranged at the top. This sealing seam, also called a cross-sealing seam, is in the two sections of material to be sealed together, for example in the closure rib of a gabled package. By means of the arrangement of the retaining ribs on the lower edge of the sealing surface, the entire area of the package above the material sections which comes to lie substantially in front of the sealing surface of the anvil is protected from tensile forces acting from below. This lower retaining rib does not need to extend continuously as far as the ends of the free lower edge. The central rib, namely the sealing rib, however, preferably extends over the entire width of the sealing surface and therefore also has substantially the width of this sealing surface described hereinabove. This central sealing rib should only be interrupted in an insignificant manner, if at all. An anvil with this construction allows the use of ultrasound for sealing sections of material, and by means of the narrow ribs (the sealing rib can have a width comparable with that of the retaining rib) the ultrasound energy and thereby the sealing energy can be focused such that more than just two material sections or layers of, for example, plastics coated paper, can be sealed together. A further advantage is in that with correct construction of the sealing unit, sealing can even be undertaken under aseptic conditions in a clean room.

If, with a preferred embodiment, a 2 liter gabled package made from plastics coated paper is to be sealed, it has been shown advantageously that the width of the sealing surface is approximately 120 mm, while its height is between approximately 15 and 30 mm. In such an application 4,600 N can be applied via the retaining ribs. Clearly, during the sealing procedure the loading by the contents and the tensile forces in the paper can be successfully blocked off. With a retaining rib according to the invention, gabled packages with a retaining seam can be manufactured which are more easy for the end-user to handle as the retaining seam produced on the product in this way blocks the tensile forces caused by the paper on the sealing seam otherwise arising when the end-user compresses a package filled with liquid. The package for flowable media manufactured using such an anvil lastly has better fluid-tightness.

It is further advantageous according to the invention when, at a distance above the sealing rib and parallel thereto, an upper cosmetic rib is arranged. The previously mentioned distance between the sealing rib and the retaining rib can be in the range of between 3 mm and 10 mm, preferably 5 mm, when the width of the sealing surface is assumed to be approximately 120 mm.

It is the case with both the previously mentioned, and the following, sizes and measurements that they (for example, the distances) change in proportion to the width of the sealing surface. This is also the case for the ranges of individual values, sizes and measurements described.

The width of the cosmetic rib itself can also be approximately 2 mm as in the case of the retaining rib and/or the sealing rib, with the above mentioned ranges pertaining to wider or narrower ribs. With an anvil for sealing a 2 liter gabled package, the distance of the cosmetic rib from the retaining rib is preferably 12 mm, this distance can, however, also be in the range of between 10 mm and 15 mm. This distance also depends on the size of the package and thereby of the corresponding anvil. The distance of the cosmetic rib from the sealing rib is then calculated as being the difference between the two distances described, for a 2 liter gabled package and a sealing surface width of 120 mm, this is then approximately 7 mm.

There is, however, another embodiment of the anvil according to the invention, which is characterised in that the cosmetic rib is configured as a raised plateau which extends as far as the free upper edge of the section of material to be sealed. Both embodiments of cosmetic ribs serve to join together the free upper surfaces of the sections of material to be sealed, so that, for example, the entire closure rib of the gabled package is closed at the top. This not only looks better but provides better hygiene as there is then no gap in the sealing seam of the package into which any dirt particles or dust could fall. The cosmetic rib works particularly well according to the second embodiment, which is configured as a raised plateau, when the package, that is to say the sections of material have a base paper edge, that is to say a coarse, open paper edge, from which dust could be given off. The raised plateau then presses the sections of material together and holds the together the fibres of the base paper edge by sealing. The raised plateau represents an optimum cosmetic rib for this purpose.

In a further advantageous embodiment of the invention, a stop, projecting approximately perpendicularly from the sealing surface, extending over the entire width of the sealing surface, is fitted on the upper edge of the sealing surface and parallel thereto. This stop could also be described as a type of rib or strip. It serves, inter alia for keeping the closing rib straight, that is to say the arrangement of the upper edge of the two sections of material, so that, for example, the sealing seam of a package is always sealed straight. In addition, the stop can also be used to maintain a minimum distance between the front surface of the anvil on the one hand, and of the sonotrode on the other hand, when, for example, it is provided that an arm attached to the sonotrode strikes against this stop when the anvil and sonotrode are brought together. It is also noted that the front surface of the anvil is not inevitably identical to the sealing surface. It is only necessary that the sealing surface is located completely on the front surface of the anvil. Although it is possible for the front surface of the anvil to be delimited by the external limits of the sealing surface, another possible embodiment described hereinafter has an anvil body, the front surface of which extends beyond the stop described, for example upwards by the same height as the sealing surface.

It is advantageous according to the invention when a web overlapping the retaining rib and the sealing rib is provided at a distance equal to approximately one sixth of the width, as a further raised area. This web has a substantially planar surface parallel to the entire sealing surface and serves to compensate for differences in the level of the sections of material to be sealed, when, for example, two layers come to lie against three layers. It is known that sealing is always difficult in areas with a stepped cross-section, for example an area with two layers of material adjacent to three layers. In the area of the two layers, inter alia, the contact pressure of the sealing jaw is too low. In the case of the anvil according to the invention, it has proved advantageous when the step or edge on the protruding layers of material overlaps or come to lie on this web. In the direction of the width of the sealing surface, the web also has a width which is between 4 and 7 mm. The width of the web equals the distance between its front edge an its rear edge. Its front edge is that which lies closest to the terminal edge of the sealing surface (at the end of its width).

The front, approximately planar surface of the web projects forwards approximately as far out of the base or rear total surface of the end face as the retaining rib or the sealing rib. It is particularly preferred, however, when the web projects forwards even 0.2 to 1 mm over the furthest forward surface of the ribs described. The planar front surface of the web can preferably be configured approximately square. By means of this raised surface, very much more ultrasound energy and thereby sealing energy is conducted into the sections of material located in front of the web than into the adjacent areas where only a narrow sealing rib is arranged. In this way the thermoplastic material on the surface of the section of material to be sealed melts in the area of the web, and problem free sealing is obtained over the steps of the different, numerous layers of material arranged over one another and adjacent to one another, for example the steps between one and two layers or two and three layers.

It is further advantageous according to the invention when the retaining rib is interrupted by a cut-out which is located at approximately half way across the width of the sealing surface, preferably displaced somewhat towards the terminal edge on the entrance side of the sealing surface. The front terminal edge of the sealing surface is described here as the entrance side terminal edge as the section of material to be sealed is introduced from this side into the space between the anvil and sonotrode, more precisely between the sealing surface of the anvil and the front surface of the sonotrode. The direction of movement of the closure rib of a cabled package is thus parallel to the sealing surface and moves intermittently from the entrance side terminal edge thereof to the opposite, exit side.

While the web described hereinabove overlaps the retaining rib and the sealing rib in order to compensate for the levels of the material to be sealed, that is to say a height of between at least 3 and at the most 10 mm, the cut-out described is located further away from the entrance side terminal edge of the sealing surface. It is particularly advantageous to not arrange the cut-out directly half way across the width, but instead somewhat further towards the terminal edge on the entrance side of the sealing surface. The term "somewhat" is to be understood as approximately 10 mm.

This cut-out provides for the isolation of the ultrasound vibrations, so that no excess ultrasound energy is conducted into the central area in the sections of material. It may happen that under certain conditions, without this cut-out, the package could break open due to the high energy flow. In particular when sterile filling is desired, which naturally must be followed by sterile closure, the package would be non-sterile at this point.

If this cut-out is related to the product to be processed, that is to say the width of the sections of material to be sealed together, for example the width of the closure rib of a gabled package, this cut-out is then advantageously arranged in the central area of this closure rib.

In an advantageous further configuration of the invention, the cosmetic rib is interrupted by a small adjustment groove, the edge of which, on the entrance side, is arranged closely adjacent to the entrance-side edge of the web. This adjustment groove facilitates the adjustment of the anvil relative to the product to be processed, that is to say relative to an edge of the material. The width of the adjustment groove is approximately 0.5 to 8 mm, is preferably in the range between 1 and 6 mm, and has, in a particularly preferred test, given good results with a width of 3 mm. When it is stated that the entrance side edge of the adjustment groove is arranged "closely" adjacent to the entrance side edge of the previously described web, a range of "several millimeters" is understood, which represents the distance between the two edges.

It is further advantageous according to the invention when the area of the anvil body located behind the sealing surface is provided with a recess in the base. A gabled package with a screw closure can be imagined, the screw cap of which is located on one of the upper wall sections inclined towards one another. If one now wishes to seal the closing seam with the anvil according to the invention, it must grip the closing seam on both sides together with the sonotrode, and there must at the same time be enough space for the closing cap. The recess described provides for this, for which reason it is moulded into the base of the anvil body. Although this recess means there is a certain weakening of the anvil body in the lower area behind the sealing surface, by means of the lengthening of the anvil body beyond the upper terminal edge of the sealing surface already indicated above, stiffening of the entire anvil is obtained such that the desired high degree of force of pressure can be transferred without any twisting of the tool.

When, in a further embodiment of the invention, in the area of the anvil body behind the sealing surface there is arranged at least one hollow space for the feeding through of flowable media, preferably one or more bores, the processing surface is cooled particularly well. The dissipation of higher temperatures on the area of the sealing rib and of the web is done easily with this heat sink in the bores, as the distance between the hot surfaces and the bores for cooling medium can be kept small.

It is further advantageous according to the invention when in the anvil body isolation bores are provided. In this way, for example, an elongate, plate-shaped space can be provided penetrating the whole anvil body from its upper surface to the other, which is parallel to the sealing surface. In this way ultrasound vibrations can be isolated from the tool areas which do not need to vibrate or must not consume vibrational energy. The ultrasound energy is in this way concentrated at those places on the sections of material where effective and specific heating is desired.

Despite the improved operating conditions of the anvil according to the invention, this can be part of a sealing unit which is used in an aseptic area for sealing sterile filled packages. The anvil is arranged stationarily relative to the sonotrode in the direction of movement. In other words, the gap for introducing the sections of material to be sealed together is produced by the movement of the sonotrode perpendicularly towards the sealing surface of the anvil and away from it. By means of the contour on the sealing surface of the anvil, tolerances in the material can be compensated for.

Figure 2:
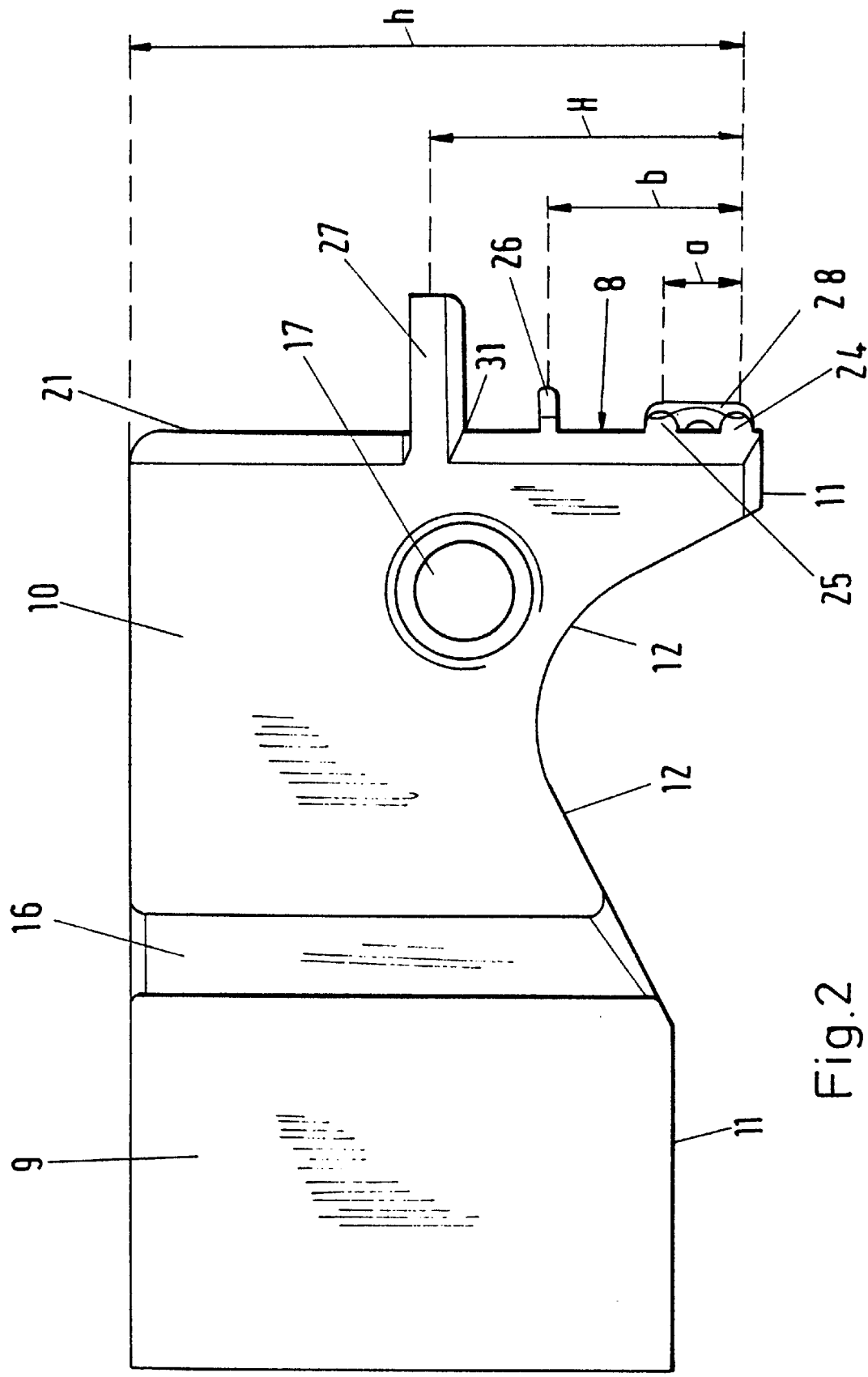
Figure 3:
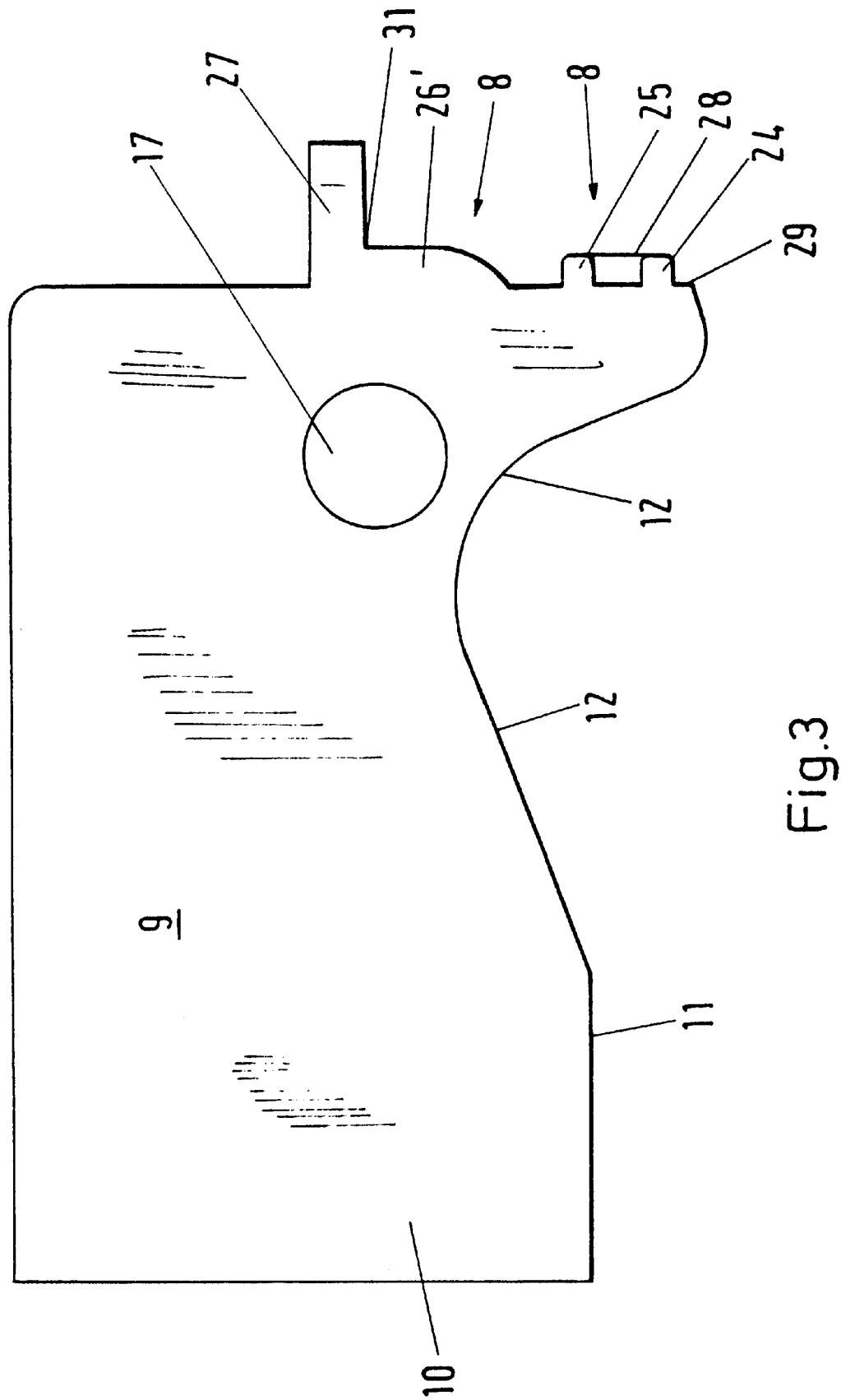
Figure 4:
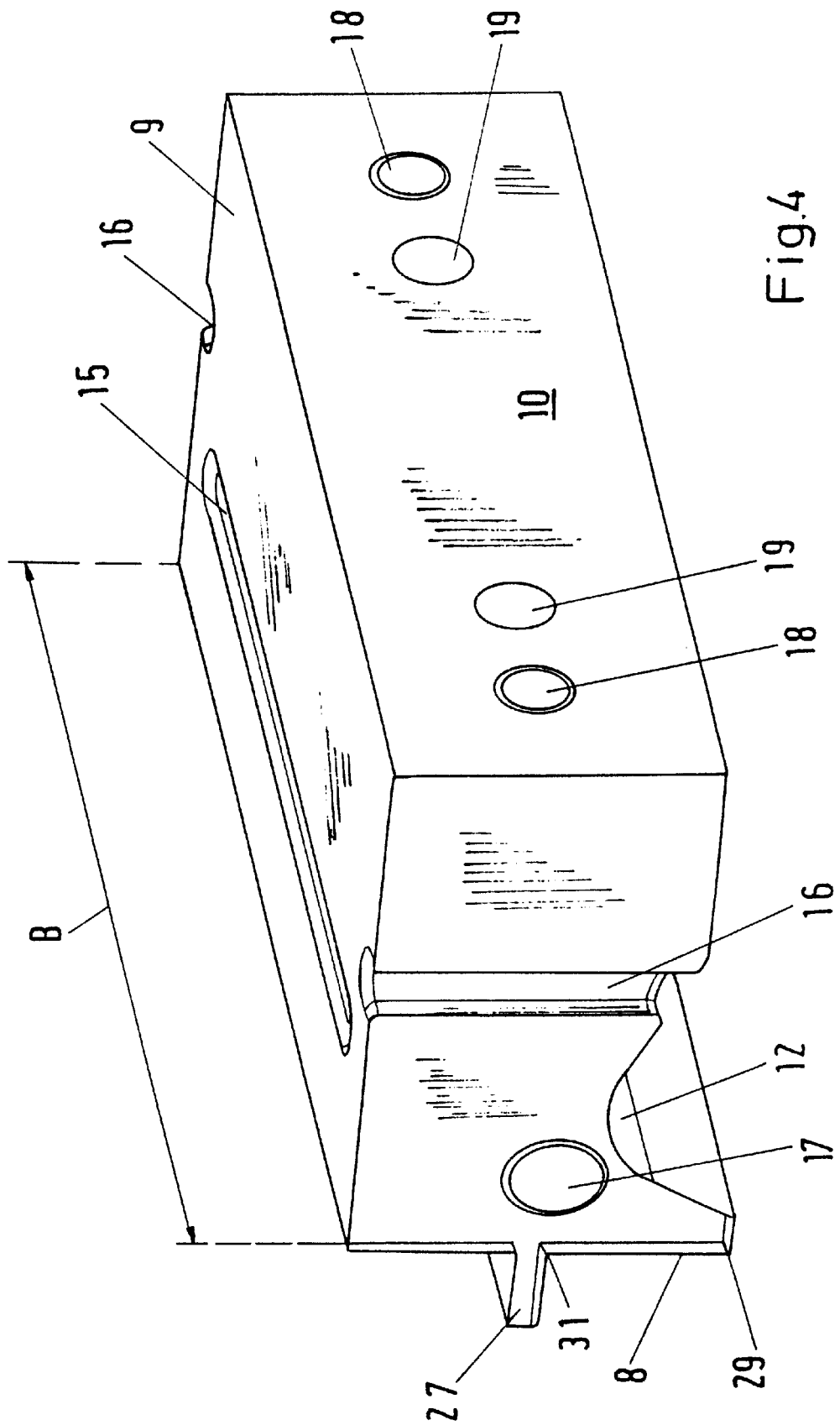
Figure 5:
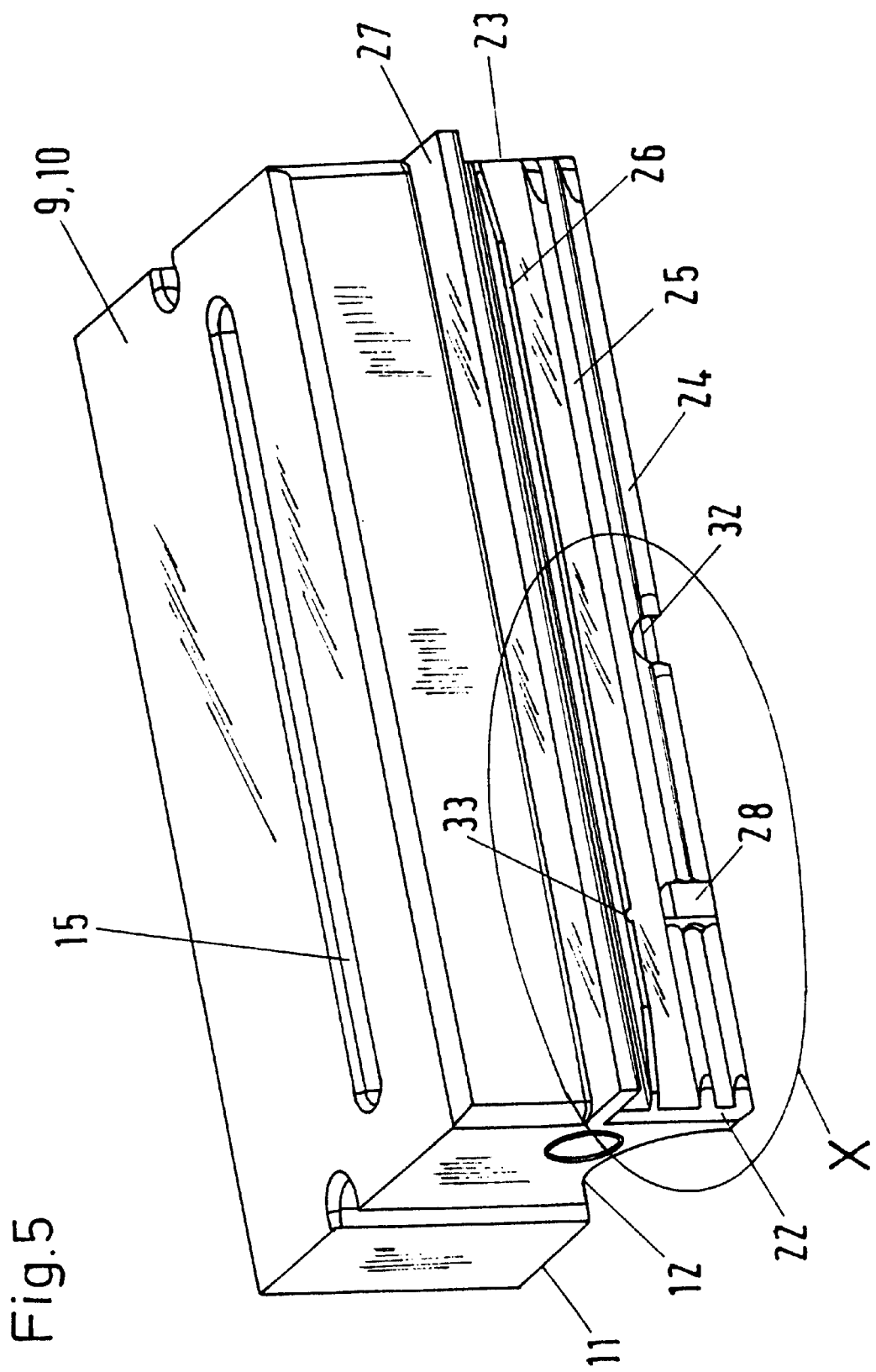
Figure 6:
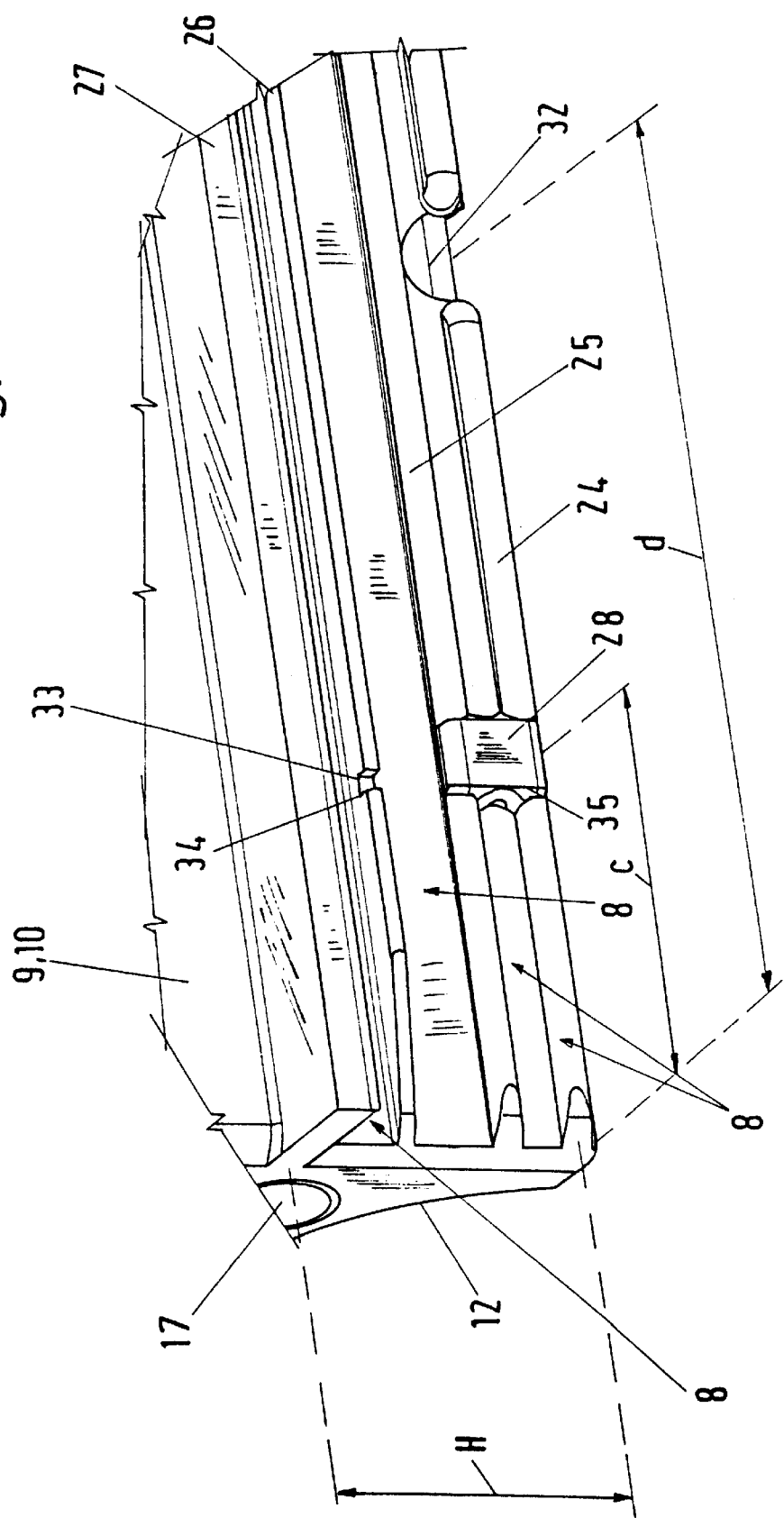

Further advantages, features and possibilities for application of the present invention will be evident from the following description of preferred embodiments with reference to the attached drawings. In these is shown, in:

FIG. 1 schematically and cut away, the closure seam of a gabled package between the anvil and sonotrode, FIG. 2 a first embodiment of an anvil viewed from the side, FIG. 3 a second embodiment of an anvil in a view comparable with FIG. 2, FIG. 4 in perspective, a rear view of an anvil according to FIG. 2 or FIG. 3, FIG. 5 the front view in perspective of an anvil according to the embodiment of FIG. 2, and FIG. 6 a cut away and enlarged section according to the oval X in FIG. 5.

Two sections of material 1 form a closure rib shown in FIG. 1 of a 2 liter gabled package, on the inclined upper surface part 3 of which there is fitted a closure cap 4 which closes a pouring aperture. The conveying means for the aseptically filled gabled package 2 in this embodiment is labelled 5, stands perpendicularly on the plane of the paper of FIG. 1 and faces the observer.

In the representation in FIG. 1, the two sections of material 1 to be sealed together of the package 2 are located exactly in the gap between the planar front surface of the sonotrode 6 and the profiled sealing surface 8 of the anvil 9. In the anvil body, labelled 10, a recess 12 projects upwards from the base 11. When the package 2 is moved past the end face 8 of the anvil 9, the screw cap 4 has space in the recess 12 to pass by without undesired touching of the tool.

The anvil 9 is fixed to the frame 13, on which the sonotrode is also attached by means of supporting arms 14. An isolating slot 15 in the anvil body, running parallel to the sealing surface 8, and lateral isolating grooves 16 also penetrating the anvil body 10 provide the mechanical isolation of the ultrasound energy. In addition, a bore 17 passes as a hollow space through the anvil body in the direction of the width B of the anvil, and thereby also its sealing surface 8, through which a flowable medium can be conducted, for example cooling water. From the perspective rear view of FIG. 4 screw bores 18 can be seen on the outside of the rear surface, and inside at a distance in each case a pin bore 19. For fixing the anvil 9 on the frame 13, pins are struck into the pin bores 19 and are fitted on the rails of the frame 13, not described in more detail. By means a screws and nuts inserted through the screw bores 18, the anvil is then screwed securely to the frame 13. In the direction of movement 20 of the sonotrode 6 with respect to the sealing surface 8 of the anvil 9, the anvil 9 is attached stationarily. This direction of movement of the sonotrode 6 is perpendicular to the sealing surface 8. In FIG. 1 this direction of movement 20 is to be assumed as parallel to the plane of the paper.

The sealing surface 8 is envisaged as a whole as approximately rectangular, with a width B (FIG. 4) and a height H (FIGS. 2 and 6). If the gabled package has a volume of 2 liters, the height H is then preferably 23 mm. It is also advantageous when this height is in the range between 15 and 30 mm. The total height h of the front surface 21 of the anvil is approximately double the height H of the sealing surface. The width B of the sealing surface and thereby also of the whole anvil is then preferably 120 mm. This width extends from the front or entrance side terminal edge 22 as far as the exit side terminal edge 23 of the sealing surface 8.

The sealing surface 8 of the anvil 9 is configured in a profiled manner with raised and indented areas. The raised areas are labelled 24–28. Of these, some are configured as ribs 24–26, one as a stop 27 and one as a web 28. Along the free edge 29 of the sealing surface 8 there runs the lowest rib which is configured as the lower retaining rib 24. At a distance a above this and parallel to the retaining rib 24 the central sealing rib 25 runs across the entire width (B) of the sealing surface (8). Again, at a distance b from the lower retaining rib 24, an upper cosmetic rib 26 runs above it and parallel to it. In the embodiment of FIGS. 2, 5 and 6 a forward projecting rib is configured approximately at right angles in the direction of movement 20 of the sonotrode relative to the anvil 9. In another embodiment such as shown, for example, in FIG. 3, the "cosmetic rib 26" begins in a radius and merges into a plateau 26', which extends as far as the free upper edge 30 (FIG. 1) of the section of material 1 to be sealed. This layer coincides with the lower surfaces of a stop 27 which is arranged at a distance H from the lower retaining rib 24 on the upper end of the sealing surface 8 and also parallel to the free lower edge 29. The upper edge of the sealing surface 8 is labelled 31.

It is evident that the stop 27 extends over the entire width B of the sealing surface 8 on this upper edge 31 and parallel thereto. The distance b is in the range of 10–15 mm, preferably 12 mm, when the 2 liter gabled package with the width B=120 mm is again assumed. The height H of the stop 27 from the lower retaining rib 24 is then in the range between 15 and 30 mm and is preferably 23 mm.

From FIG. 6 with the enlarged detail X of FIG. 5, web 28 overlapping the lower retaining rib 24 and the sealing rib 25 is evident. This is located at a distance c (FIG. 6) equal to approximately one sixth of the width B of the sealing surface * from the entrance side edge 22. If the width B is again assumed as 120 mm, the distance c=20 mm has proved advantageous.

The lower retaining rib 24 is interrupted by a cut out 32. This is located approximately at half the width B of the sealing surface 8, wherein the distance d (FIG. 6) of the cut out 32 from the entrance side edge 22 of the sealing surface 8 is 50 mm in the present example, namely the centre of the entire width B, less 10 mm. The cut out 32 is thus somewhat closer to the entrance side terminal edge 22 than the opposite, exit side terminal edge 23.

The cosmetic rib 26 (and also in a manner not shown, the cosmetic rib 26' of the other embodiment) is interrupted by a narrow adjustment groove 33. The entrance side terminal edge 34 of it which, in the representation in FIGS. 5 and 6 is the left-hand edge adjacent to the entrance side terminal edge 22, is arranged closely adjacent to the entrance side edge 35 of the web 28. In this case 15≦c≦25. The width of the web 28 measured in the entire width B of the sealing surface 8, is in the range between 4 and 7 mm, preferably precisely 7 mm. The centre of the cut out 32 from the exit side terminal edge 23 is at a distance which is between 60 and 80 mm, and preferably 70 mm. With a 2 liter package with the width B=120 mm this is here B/2+10 mm.

What is claimed is:

1. An anvil for use in conjunction with an ultrasound sealing unit for sealing at least two sections of material (1) that comprise a plastic coated support material, said ultrasound sealing unit comprising said anvil (9) and a sonotrode (6) movable relative to the anvil, wherein a sealing surface (8) at a front of a body (10) of anvil (9) is profiled with raised and indented areas (24–28), wherein the raised areas of the sealing surface (8) are configured as a plurality of narrow ribs one of which is a lower retaining rib (24) running along a free lower edge (29) of the sealing surface (8) and one of which is a central sealing rib (25) at a distance (a) above said rib (24) and parallel to said rib (24) extending across the entire width (B) of the sealing surface (8), wherein a web (28) overlapping the retaining T.B. (24) and the sealing rib (25) is provided as a further raised area at a distance (c) along ribs (24) and (25) equal to approximately one sixth of a width (B) of the sealing surface (8).

2. Anvil according to claim 1, wherein a cosmetic rib (26) is arranged at a distance above the sealing rib (25) and parallel thereto.

3. Anvil according to claim 2, wherein the cosmetic rib (26') is configured as a raised plateau (26'), which extends as far as the free upper edge (30) of the section of material (1) to be sealed.

4. Anvil according to claim 1, wherein a stop (27) extending across an entire width (B) of the sealing surface (8) is fitted on an upper edge (31) of the sealing surface (8) and parallel thereto.

5. Anvil according to claim 2, wherein a stop (27) extending across an entire width (B) of the sealing surface (8) is fitted on an upper edge (31) of the sealing surface (8) and parallel thereto.

6. Anvil according to claim 3, wherein a stop (27) extending across an entire width (B) of the sealing surface (8) is fitted on an upper edge (31) of the sealing surface (8) and parallel thereto.

7. Anvil according to claim 4, wherein retaining rib (24) is interrupted by a cut out (32) which is located at approximately half the width (B) of the sealing surface (8), preferably somewhat offset towards the entrance side terminal edge (22) of the sealing surface (8).

8. Anvil according to claim 2, wherein the cosmetic rib (26, 26') is interrupted by a narrow adjustment groove (33), an entrance side edge (34) of which is arranged closely adjacent to an entrance side edge (35) of the web (28).

9. Anvil according to claim 3, wherein the cosmetic rib (26, 26') is interrupted by a narrow adjustment groove (33), an entrance side edge (34) of which is arranged closely adjacent to an entrance side edge (35) of the web (28).

10. Anvil according to claim 9, wherein the cosmetic rib (26, 26') is interrupted by a narrow adjustment groove (33), an entrance side edge (34) of which is arranged closely adjacent to an entrance side edge (35) of the web (28).

11. Anvil according to claim 1, wherein the area of the anvil body (10) located behind the sealing surface (8) is provided with a recess (12) in the base (11).

12. Anvil according to claim 2, wherein the area of the anvil body (10) located behind the sealing surface (8) is provided with a recess (12) in the base (11).

13. Anvil according to claim 10, wherein the area of the anvil body (10) located behind the sealing surface (8) is provided with a recess (12) in the base (11).

14. Anvil according to claim 1, wherein at least one hollow space (17) for the passage of flowable media is arranged in the area of the anvil body (10) located behind the sealing surface (8).

15. Anvil according to claim 1, wherein isolation bores (15, 16) are provided in the anvil body (10).

* * * * *

UNITED STATES PATENT AND TRADEMARK OFFICE
CERTIFICATE OF CORRECTION

PATENT NO. : 5,976,315
DATED : Nov. 2, 1999
INVENTOR(S) : Peter Josef Martin

It is certified that error appears in the above-identified patent and that said Letters Patent is hereby corrected as shown below:

Claim 1, line 14, delete "T.B." and insert --rib-- in its place.

Signed and Sealed this

Thirteenth Day of June, 2000

*Attest:*

Q. TODD DICKINSON

*Attesting Officer*    *Director of Patents and Trademarks*